Aug. 7, 1962 — L. PERKINS — 3,048,835

TRANSPONDER DEVICES FOR USE IN SECONDARY RADAR SYSTEMS

Filed Jan. 20, 1958 — 2 Sheets-Sheet 1

Inventor
Leonard Perkins
By
Ralph B. Stewart
Attorney

United States Patent Office 3,048,835
Patented Aug. 7, 1962

3,048,835
TRANSPONDER DEVICES FOR USE IN SECONDARY RADAR SYSTEMS
Leonard Perkins, Twickenham, England, assignor to A. C. Cossor Limited, London, England
Filed Jan. 20, 1958, Ser. No. 710,031
Claims priority, application Great Britain Nov. 12, 1957
7 Claims. (Cl. 343—6.8)

The present invention relates to improvements in transponder devices for use in secondary radar systems.

It has previously been proposed to attain side lobe suppression in a secondary radar system by the use of a transponder in the receiver portion of which there is incorporated a capacitor which is set to a potential level by a control pulse utilised in the secondary radar system, the interrogating pulse of the system bearing a predetermined time and amplitude relationship with respect to the control pulse for consequent triggering off of the transmitter portion of the transponder. A system of this type is disclosed in co-pending application 352,322, filed May 1, 1953, now Patent No. 2,824,301.

It is an object of the present invention to enable operation of a transponder to be effected by the joint action of the control pulse and the interrogator pulse utilised in a secondary radar system without recourse being had for this purpose to a capacitor which involves a comparatively long time-constant during which the transponder receiver is desensitized. The present invention involves a pulse-amplitude comparison circuit for combining the two pulses in such manner that the transponder is not desensitized for any time greater than the duration of the control and interrogating pulses.

According to the present invention there is provided a transponder device to be controlled by a control pulse followed at a predetermined interval by an interrogating pulse of a secondary radar system comprising a receiver responsive to said control and interrogating pulses, a delay line energized by the output of said receiver connected to an input to said delay line and a normally closed gate device having an output connection for operative connection to a transmitter of the transponder device and means for rendering said gate device operative to provide a requisite output to said output connection through pulses derived from said delay line at first and second take-off points thereof spaced apart a distance corresponding to said predetermined time interval.

According to a feature of the present invention the delay line may be of a balanced construction with the receiver portion of the transponder device feeding a signal to a central portion of the delay line, the output being derived from one or the other side of the delay line or from both sides of the delay line. One suitable form of delay line comprises a rod-like core of magnetostrictive material carrying coils of short length distributed along its length.

The gating arrangement for controlling the transmitter may be provided by a single thermionic valve device comprising two control grids each of which two grids is required to have a certain potential applied to it before the thermionic valve is rendered conducting for acting as a gate. It may be arranged that a single thermionic valve acts as a gate to open only when the received interrogator pulse attains a predetermined level with respect to the control pulse and both the control and interrogator pulses are present.

Use may be made of a double delay line arrangement, and which double delay line arrangement may be provided by a symmetrically disposed delay line as previously described, for ensuring that the transmitter portion of the transponder device is triggered off only when the received interrogator pulse is between predetermined levels with respect to the control pulse.

Reference is now made to the accompanying drawings in which.

Figure 1:
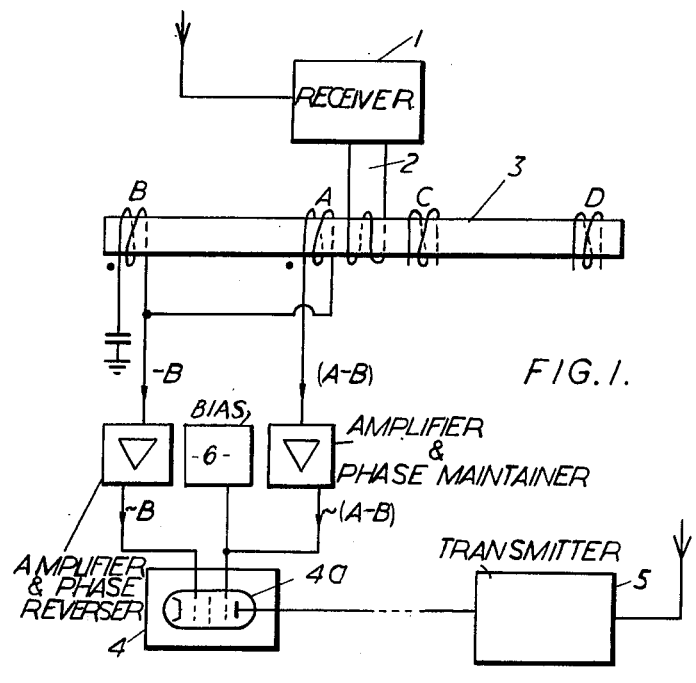
FIGURE 1 is a diagrammatic representation of one form of a transponder system according to the invention.

In FIGURE 1 the block 1 indicates the receiver portion of a transponder device. This receiver responds to control and interrogating pulses transmitted from the secondary radar system and produces at its output corresponding signal pulses $Pc$, $Pi$, the interrogating pulse $Pi$ following the control pulse $Pc$ by a definite time lag as shown at the portion (a) of FIGURE 2. It would be understood that the time interval between the control pulse and the interrogating pulse is relatively small with respect to the recurrence rate at which the pair of pulses are radiated, see the above-mentioned Patent 2,824,301. The output from this receiver 1 is supplied through a connection indicated at 2 to the central portion of a symmetrically disposed delay line device indicated by reference numeral 3. To each side of the central portion of the delay line device there are disposed take-off connections, to the left of the central portion there being indicated two take-off connections A and B, take-off A being adjacent the central portion while take-off B lies towards the outer end of the left-hand portion of the delay line 3. The dot to one side of each of these take-off connections A and B indicates the side of positive polarity, the other side of the respective take-off connections being of negative polarity.

Suitable delay lines are known in the art, including electromagnetic delay lines, piezo-electric delay lines, and magnetostrictive delay lines, one form of which is disclosed in greater detail below.

The delay line 3 operates such that a signal output is available from the take-off A and also a signal output is available from the take-off B, the signal output from the take-off B being delayed by a predetermined time with respect to the take-off signal output available from the take-off A. It is arranged that the time delay between the take-off connections A and B is equal to the time delay between the corresponding control pulse $Pc$ and the interrogating pulse $Pi$ received from the secondary radar system in which the transponder device is required to operate.

Thus, for a control pulse $Pc$ spaced a given number of micro-seconds before the corresponding interrogator pulse $Pi$, there will be obtained from the take-off B, a signal pulse $Bc$ (FIGURE 2b) of an amplitude dependent upon the level of the control pulse received by the transponder. The corresponding interrogating pulse $Pi$, will provide a signal pulse output from the take-off A simultaneously with the pulse $Bc$, see FIG. 2c. These signal outputs from the take-off B and take-off A are, by proper polarity connections, arranged to provide a pulse output dependent upon the difference between the signal pulse output A and the signal pulse output B, to provide at the output of winding A a resultant output pulse $Pic$ (FIGURE 2d) for transmission to a gating arrangement 4, provided in the transponder device. Thereby there is supplied for the gating arrangement a signal pulse of an amplitude dependent upon the difference in amplitude levels between the control pulse $Pc$ and the corresponding interrogating pulse $Pi$. The signal pulse output from B is fed, as indicated to the left of FIG. 1, through an amplifier and phase reversing arrangement, for proper polarity connection, to the gating arrangement 4, while the signal pulse output from A along with the pulse from B is fed through an amplifier, of the same amplification factor as the previously mentioned amplifier, to the gating arrangement 4.

Figure 2:
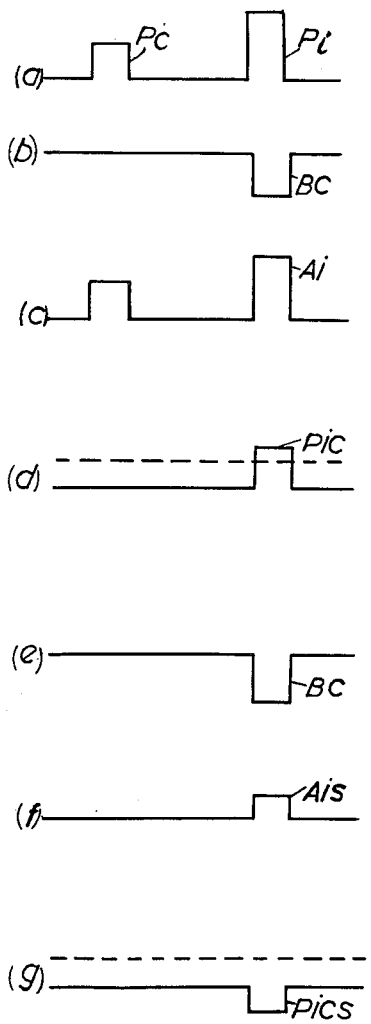
FIGURE 2 is a series of curves or graphs illustrating the operation of the transponder system.

The pulses derived at take-off points A and B, due to the time delay between take-off B and take-off A being equal to the time delay between the control pulse Pc and the corresponding interrogating pulse Pi in the secondary radar system, occur simultaneously for application to the gating arrangement, and are so indicated by simultaneously occurring pulses Bc and Ai in curves (b) and (c) of FIG. 2. Due to their polarity arrangements as above described the interrogating pulse received at the transponder device is compared with the level of the corresponding control pulse, and a resultant pulse Pic is produced as shown in the curve (d) of FIGURE 2. It is only when this resultant pulse signal pulse Pic exceeds a predetermined level as shown by the dashed line in curve (d) that the gating arrangement can cause operation of the transmitter portion 5 of the transponder device. The gate device may comprise a single electron tube 4a having two control grids, one of which (the second grid) is supplied with an input proportional to the resultant pulse Pic, and the other supplied with an input similarly proportional to pulse Bc derived from take-off point B. To effect opening of the gate 4 it is required that both Bc be present and that the value of resultant pulse Pic exceeds a predetermined value which will be determined by the value of the bias 6 applied to the second grid of tube 4a.

Thus, the gating arrangement requires both the control pulse and the corresponding interrogating pulse to be present and for the interrogating pulse to exceed the corresponding control pulse by a predetermined amplitude for the gating arrangement to cause subsequent triggering off of the transmitter portion of the transponder device.

If an electromagnetic delay line is used, the polarities at the take-off connections A and B will be the same and in this case a phase-reversing transformer may be utilised at one of these take-off connections to enable the outputs from the take-off connections A and B to be combined in the requisite manner for deriving an output dependent upon the difference in amplitude between the signal pulse output at A and that at B, i.e. proportional to $(A-B)$. The combined signal $(A-B)$ will require to be fed into a sufficiently high impedance so that current through the circuit of the transformer secondary winding is too low to produce spurious pulses when only one, i.e. only A or only B, of the signal pulse outputs is present. With a magneto-strictive delay line, the take-off connections A and B may have their respective coils connected in series opposition, as indicated in FIG. 1. In the case of a piezo-electric delay line, diodes may be employed and requisite phase inversion may be obtained by reverse crystal take-offs.

At the parts e, f and g of FIG. 2 there are indicated corresponding pulses for side-lobe signals occurring in the secondary radar system. For such side-lobes, the control pulse Bc at FIG. 2e is at the same amplitude as in FIG. 2b, whereas for the side-lobe pulse occurring at the instant of transmission of an interrogator pulse, the amplitude level for the side-lobe pulse Ais (FIG. 2f) appearing at the point A is less than for the interrogator pulse proper as indicated at Ai FIG. 2c. Thus the resultant summation for the side-lobe pulses shown at Pics in FIG. 2f is negative and the requisite level for the amplitude difference between the interrogator pulse and corresponding control pulse is not attained. The subsequent triggering of the transmitter portion of the transponder device through the gating arrangement, therefore, does not occur for the side-lobe pulses of the secondary radar system.

Figure 3:
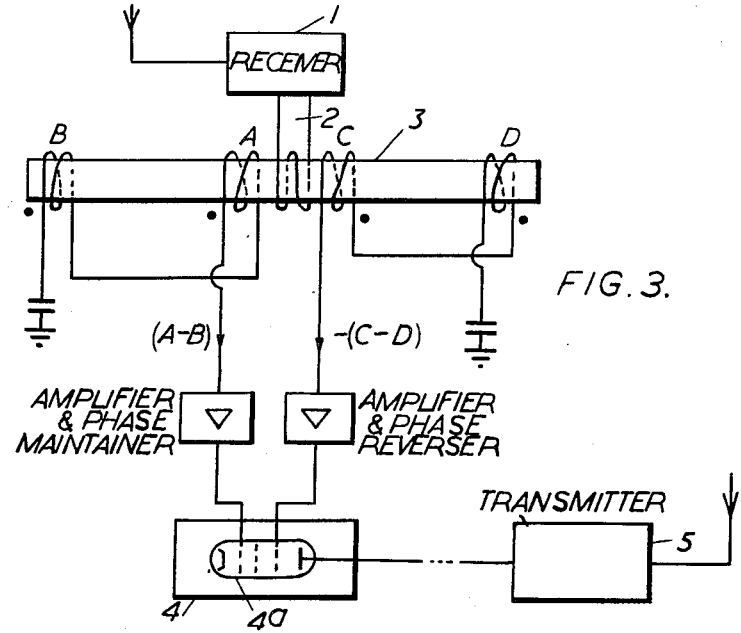
FIGURE 3 is a diagrammatic representation of a second form of transponder system according to the invention.

In FIG. 3 of the accompanying drawings there is illustrated in block diagrammatic form a delay line arrangement in which signals are taken off from both sides of a symmetrically disposed magnetostrictive delay line device 3 formed of a rod-like core of magnetostrictive material and carrying coils of short length distributed over its length. Receiver 1 energizes one coil at the centre of the line, and take-off coils at the points A, B, C and D supply pulses to the respective take-off connections. The left-hand grid of the gating tube 4a has fed to it through an amplifier a signal derived from the combination of signal pulse outputs from take-off coils A and B on the left-hand side of the magnetostrictive delay line. The right-hand grid of tube 4a has fed to it through an amplifier and phase reverser, of equal amplification to that of the amplifier aforementioned, a signal derived from the combination of signal outputs from take-off coils C and D arranged to the right-hand side of the magnetostrictive delay line. The take-off coils C and D are arranged to give signal outputs of opposite polarity to those provided respectively by the take-off coils A and B, that is, coil C will supply a negative pulse if coil A supplies a positive pulse, and coil D will supply a positive pulse where coil B supplies a negative pulse. The gating arrangement 4 will only operate to provide a signal for triggering-off of the transmitter portion of the transponder device when the signal indicated as being supplied to the left-hand side of 4 in FIG. 3 is present and exceeds a predetermined value simultaneously with the signal indicated in FIG. 3 as being applied to the right-hand side of the gating arrangement 4, the signal applied to the right-hand side also being required to exceed a predetermined level. Due to the opposite polarity of signals provided by take-off coils C and D with respect to the corresponding signals from take-off coils A and B, the gating arrangement 4 in FIG. 3 will only operate to effect subsequent triggering-off of the transmitter portion of the transponder device when the interrogator pulse received at the transponder is between predetermined amplitude levels with respect to the control pulse.

Obviously, other forms of delay lines may be employed in FIG. 3, the magneto-strictive form being shown merely for the purpose of illustration.

I claim:

1. In a gating system to be controlled by a pair of control pulses spaced apart by a fixed time interval, the combination of a delay-line, means applying said control pulses to an input point on said line, means deriving a pair of uni-directional output pulses from said line at first and second take-off points spaced apart a distance corresponding to said time interval, said output pulses being of opposite polarity means combining said output pulses to produce a resultant uni-directional pulse of an amplitude proportional to the difference between the amplitudes of said output pulses, and a polarity determined by the output pulse of greater amplitude, an electron valve biased to cut-off and having a control circuit, and means applying said resultant pulse to said control circuit.

2. A system according to claim 1 wherein said electron valve has a second control circuit, and means for energising the second control circuit with uni-directional pulses derived from the second take-off point on said delay-line.

3. A system according to claim 1 wherein said delay-line is a symmetrically balanced line with the input point at the centre and having third and fourth take-off points on the opposite side of the centre from said first and second take-off points, and said electron valve having a second control circuit energised through pulses derived from said third and fourth take-off points, the pulses from the third and fourth take-off points being of opposite polarity with respect to the pulses from the first and second take-off points respectively.

4. A transponder device to be controlled by a control pulse followed after a predetermined interval by an interrogating pulse of amplitude greater than the control pulse, said control and interrogating pulses being transmitted at recurring time intervals which are large with respect to the interval between the control pulse and the interrogating pulse, the transponder device comprising a normally-inactive transmitter, a normally-closed gate device for rendering said transmitter active and having control means responsive to a positive voltage above a predetermined value to effect operation of said transmitter, a receiver responsive to said control and interrogating pulses, a delay-line energized by the output of said receiver connected to an input point on said line, means for deriving a positive pulse from said delay line at a first take-off point and a negative pulse at a second take-off point, said take-off points being spaced apart a distance corresponding to said predetermined time interval, whereby a negative pulse occurs at said second take-off point in response to said control pulses simultaneously with a positive output pulse at the first take-off point in response to said interrogating pulse, and a circuit for combining said output pulses in opposing relation and supplying a resultant pulse to said control means whereby said gate device is opened when said interrogating pulse exceeds said control pulse by an amount to produce a resultant pulse greater than said predetermined value.

5. A transponder according to claim 4 wherein said gate device is provided with second control means acting jointly with said first mentioned control means and requiring a positive potential applied thereto for the opening of said gate, and polarity reversing means for applying the output pulse from said second take-off point to said second control means.

6. A transponder device to be controlled by a control pulse followed after a predetermined interval by an interrogating pulse of amplitude greater than the control pulse, said control and interrogating pulses being transmitted at recurring time intervals which are large with respect to the interval between the control pulse and the interrogating pulse, the transponder device comprising a normally-inactive transmitter, a normally-closed gate device for rendering said transmitter active and comprising an electron valve having two control grids, a receiver responsive to said control and interrogating pulses, a delay-line energized by the output of said receiver connected to an input point on said line, means for deriving a positive pulse from said delay line at a first take-off point and a negative pulse at a second take-off point, said take-off points being spaced apart a distance corresponding to said predetermined time interval, whereby a negative pulse occurs at said second take-off point in response to said control pulses simultaneously with a positive output pulse at the first take-off point in response to said interrogating pulse, and a circuit for combining said output pulses in opposing relation and supplying a resultant pulse to one of said control grids, and a polarity reversing circuit for applying the output pulse from the second take-off point to the other control grid of said electron valve.

7. A transponder device to be controlled by a control pulse followed after a predetermined interval by an interrogating pulse of amplitude greater than the control pulse, said control and interrogating pulses being transmitted at recurring time intervals which are large with respect to the interval between the control pulse and the interrogating pulse, the transponder device comprising a normally-inactive transmitter, a normally-closed gate device for rendering said transmitter active and comprising an electron valve having two control grids, a receiver responsive to said control and interrogating pulses, a delay-line energized by the output of said receiver connected to said line at an input point located near the middle thereof, means on each side of said input point for deriving output pulses from first and second take-off points which are spaced apart a distance corresponding to said predetermined time interval, whereby a pulse occurs at each second take-off point in response to said control pulse simultaneously with an output pulse at the corresponding first take-off point in response to said interrogating pulse, the output pulses at the take-off points on one side of said input point being reversed in polarity with respect to the output pulses of the corresponding take-off points on the other side of said input point, and the output pulse at each first take-off point being reversed with respect to the second take-off point on each side of said input point, a circuit for combining the output pulses on one side of said input point in opposing relation and supplying a resultant pulse of positive polarity to one control grid of said valve, and a second circuit for combining the output pulses on the other side of said input point in opposing relation to produce a resultant pulse of negative polarity, and polarity reversing means applying said negative pulse to the other control grid of said valve.

References Cited in the file of this patent

UNITED STATES PATENTS

| | | |
|---|---|---|
| 2,509,207 | Busignies | May 30, 1950 |
| 2,741,759 | Parker | Apr. 10, 1956 |
| 2,797,410 | Korman et al. | June 25, 1957 |